(12) United States Patent
Chang

(10) Patent No.: US 12,551,579 B2
(45) Date of Patent: Feb. 17, 2026

(54) F-18 POSITRON DIAGNOSTIC CONTRAST AGENT PRECURSOR AND METHOD OF MANUFACTURING THE SAME

(71) Applicant: INSTITUTE OF NUCLEAR ENERGY RESEARCH, ATOMIC ENERGY COUNCIL, EXECUTIVE YUAN, Taoyuan (TW)

(72) Inventor: Yu Chang, Taoyuan (TW)

(73) Assignee: INSTITUTE OF NUCLEAR ENERGY RESEARCH, ATOMIC ENERGY COUNCIL, EXECUTIVE YUAN, Taoyuan (TW)

( * ) Notice: Subject to any disclaimer, the term of this patent is extended or adjusted under 35 U.S.C. 154(b) by 680 days.

(21) Appl. No.: 17/956,326

(22) Filed: Sep. 29, 2022

(65) Prior Publication Data

US 2024/0123096 A1    Apr. 18, 2024

(51) Int. Cl.
*A61K 51/04*    (2006.01)

(52) U.S. Cl.
CPC .............................. *A61K 51/0455* (2013.01)

(58) Field of Classification Search
CPC .................................................. A61K 51/0455
USPC .......................................................... 424/9.1
See application file for complete search history.

*Primary Examiner* — Michael G. Hartley
*Assistant Examiner* — Sean R Donohue
(74) *Attorney, Agent, or Firm* — Maschoff Brennan

(57) ABSTRACT

A F-18 positron diagnostic contrast agent precursor, the F-18 positron diagnostic contrast agent prepared using the F-18 positron diagnostic contrast agent precursor can be used for positron emission tomography to detect type II vesicular monoamine transporter, produce no metabolites similar to F-18-propanol because the F-18 is marked on the aromatic ring, and can reduce the background value of normal organs while using.

6 Claims, 4 Drawing Sheets

```
┌─────────────────────────────────────────────────────────────────┐
│                                                            ╭ S1 │
│  Dissolving 80 mg of                                            │
│  (2R,3R,5R)-8-chloro-2,3,4,6,7,11-hexahydro-3-isobutyl-10-methoxy-1H-pyrido[2,1-a]isoquinoline-2,9-diol in │
│  4.3 ml of anhydrous tetrahydrofuran.                           │
│                                                                 │
│  Adding 20 mg of sodium hydride, stirring at room temperature for 5 minutes. │
│  Adding 35 mg of N-chlorobutanediimide and refluxing at 66 °C for 4 hours. │
│  Cooling down to room temperature to obtain a first reaction mixture. │
│  Pouring the first reaction mixture into 20 ml of water.        │
│  Extracting 3 times with 20 ml of dichloromethane.              │
│  Removing water from the organic layer with anhydrous sodium sulfate. │
│  Concentrating under reduced pressure.                          │
│  Performing liquid chromatography to obtain a first compound.   │
└─────────────────────────────────────────────────────────────────┘
```

Dissolving 260 mg of the first compound in 21.7 ml of anhydrous acetone.
Adding 0.1 ml of 1-bromopropane and 1.08 g of cesium carbonate.
Refluxing at 60°C for 2 hours.
Cooling down to room temperature.
Concentrating under reduced pressure to collect a second solid product.
Adding 21 ml of water to dissolve the second solid product.
Extracting 3 times with 21 ml of ethyl acetate to obtain a reaction product.
Collecting an organic layer of the reaction product.
Washing the organic layer with 12 ml of saturated brine.
Dehydrating the organic layer with anhydrous sodium sulfate, concentrating under reduced pressure.
Performing liquid chromatography to obtain a second compound.

FIG.3

Dissolving 90 mg of the second compound, 72 mg of B2Pin2, 4.3 mg of Pd2dba3, 4.5 mg of Xphos and 34.7 mg of koac in 1.2 ml of anhydrous 1,4-dioxane.

Refluxing at 110°C for 3hours to obtain a third reaction mixture.

Cooling down the third reaction mixture to room temperature.

Concentrating under reduced pressure at 55°C to collect a third solid product.

Dissolving the third solid product in dichloromethane.

Filtering through celite to obtain a dissolved part.

Washing the dissolved part 3 times with water to obtain a third product.

Dehydrating a organic layer of the third product with anhydrous sodium sulfate.

Concentrating under reduced pressure.

Performing liquid chromatography to obtain the F-18 positron diagnostic contrast agent precursor.

F-18 POSITRON DIAGNOSTIC CONTRAST AGENT PRECURSOR AND METHOD OF MANUFACTURING THE SAME

FIELD OF THE INVENTION

The present invention relates to an F-18 positron diagnostic contrast agent precursor, and more particularly to an F-18 positron diagnostic contrast agent precursor and method of manufacturing the same.

BACKGROUND OF THE INVENTION

Approximately 6.2 million people had been suffering from Parkinson's disease (PD) all over the world in 2015, and the expected life expectancy of the patients is approximately 7-14 years. Parkinson's disease is mainly diagnosed by symptoms; there is no effective cure for Parkinson's disease currently. The symptoms can be improved by diet control and rehabilitation.

Many public health organizations have begun to pay attention to Parkinson's disease. In nowadays, the main clinical method for diagnosing a patient with Parkinson's disease is still applying the neuropsychological assessment method and the staining method of brain neuropathology, which have been started applying since the last century. However, when a patient is diagnosed with Parkinson's disease by the assessment, cerebral neuropathy has usually progressed to a severe stage with obvious symptoms and the treatment of the patient is no longer effective.

According to research, a developing radioactive isotope fluorine-18(F-18) positron Parkinson's disease diagnostic nuclear medicine is F-18-AV-133. AV-133 is an analog of dihydrotetrabenazine (DTBZ), which can specifically combine with type II vesicular monoamine transporter (VMAT2). The main function of VMAT2 is to transport monoamine neurotransmitters (such as dopamine, norepinephrine, serotonin, histamine) from the cytoplasm to synaptic vesicles. After AV-133 is marked with F-18, it becomes F-18-AV-133. After injection into the human body, F-18-AV-133 will combine with VMAT2 expressed on neurons and accumulate in the striatum, brain stem, hippocampus, and substantia nigra. Detection of VMAT2-expressing cells and the number of these cells is performed by positron imaging; since neurodegenerative diseases are closely related to VMAT2, F-18-AV-133 can be a potential positron medicine for neurodegenerative diseases.

However, the F-18 ligation of F-18-AV-133 is marked on the side chain. F-18-AV-133 may undergo dealkylation in the liver and form F-18-containing metabolites such as F-18-propanol. F-18-propanol may pass through the lungs and excreted from the body, and the clearance of radioactive marker become slowly in lung. Structural instability caused by side chains lead to subsequent interference factors in organ background values.

Using F-18 anion to directly carry out nucleophilic substitution (SnAr) reaction on the benzene ring of AV-133 usually requires higher temperature conditions, and a good electron-withdrawing group must be connected to the benzene ring first. Therefore it needs to undergo a subsequent functional group conversion reaction to remove the electron-withdrawing group after the F-18 substitution reaction has completed. These reactions involve more synthesis steps and higher cost and the subsequent application will be limited.

SUMMARY OF THE INVENTION

Accordingly, an objective of the present invention is to provide an F-18 positron diagnostic contrast agent does not produce metabolites such as F-18-propanol. So the F-18 positron diagnostic contrast agent has lower background levels in normal organs and is easier to produce.

The present invention provide an F-18 positron diagnostic contrast agent precursor represented by the following general formula (1):

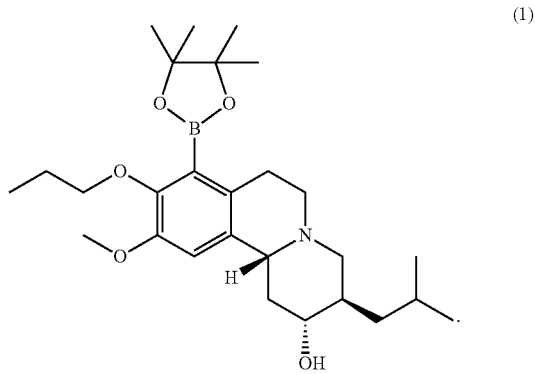

In an embodiment, the present invention provides an F-18 positron diagnostic contrast agent formed by introducing a radioactive isotope fluorine-18 which replacing the pinacolborane group of the F-18 positron diagnostic contrast agent precursor described above.

In an embodiment, the present invention provides the F-18 positron diagnostic contrast agent described above, wherein the F-18 positron diagnostic contrast agent is a contrast agent for detecting type II vesicular monoamine transporter.

In an embodiment, the present invention provides the F-18 positron diagnostic contrast agent described above, wherein the F-18 positron diagnostic contrast agent is a contrast agent for positron emission tomography.

In an embodiment, the present invention provides a method of manufacturing the F-18 positron diagnostic contrast agent precursor as claimed in claim 1, comprising: a first step which dissolving 80 mg of (2R,3R,5R)-8-chloro-2,3,4,6,7,11-hexahydro-3-isobutyl-10-methoxy-1H-pyrido[2,1-a]isoquinoline-2,9-diol in 4.3 ml of anhydrous tetrahydrofuran, adding 20 mg of sodium hydride, stirring at room temperature for 5 minutes, adding 35 mg of N-chlorobutanediimide and refluxing at 66° C. for 4 hours, cooling down to room temperature to obtain a first reaction mixture, pouring the first reaction mixture into 20 ml of water, extracting 3 times with 20 ml of dichloromethane, removing water from the organic layer with anhydrous sodium sulfate, concentrating under reduced pressure, and performing liquid chromatography to obtain a first compound; a second step which dissolving 260 mg of the first compound in 21.7 ml of anhydrous acetone, adding 0.1 ml of 1-bromopropane and 1.08 g of cesium carbonate, refluxing at 60° C. for 2 hours, cooling down to room temperature, concentrating under reduced pressure to collect a second solid product, adding 21 ml of water to dissolve the second solid product, extracting 3 times with 21 ml of ethyl acetate to obtain a reaction product, collecting an organic layer of the reaction product, washing the organic layer with 12 ml of saturated brine, dehydrating the organic layer with anhydrous sodium sulfate, concentrating under reduced pressure, and performing liquid chromatography to obtain a second compound; and a third step which dissolving 90 mg of the second compound, 72 mg of B2Pin2, 4.3 mg of Pd2dba3, 4.5 mg of Xphos and 34.7 mg of KOAc in 1.2 ml of anhydrous 1,4-dioxane and refluxing at 110° C. for 3 hours to obtain a third reaction mixture, cooling down the third reaction mixture to room temperature, concentrating under reduced pressure at 55° C. to collect a third solid product, dissolving the third solid product in dichloromethane, filtering through celite to obtain a dissolved part, washing the dissolved part 3 times with water to obtain a third product, dehydrating a organic layer of the third product with anhydrous sodium sulfate, concentrating under reduced pressure, and performing liquid chromatography to obtain the F-18 positron diagnostic contrast agent precursor.

In an embodiment, the present invention provides the method described above, wherein in liquid chromatography of the first step, solid stationary phase is a $SiO_2$ column, liquid mobile phase is a 1:1 mixture of dichloromethane and ethyl acetate, and retention factor value is 0.37.

In an embodiment, the present invention provides the method described above, wherein in liquid chromatography of the second step, solid stationary phase is a $SiO_2$ column, liquid mobile phase is a 1:1 mixture of dichloromethane and ethyl acetate, and retention factor value is 0.625.

In an embodiment, the present invention provides the method described above, wherein in liquid chromatography of the third step, solid stationary phase is a $SiO_2$ column, liquid mobile phase is a 1:1 mixture of dichloromethane and ethyl acetate, and retention factor value is 0.65.

In an embodiment, the present invention provides the method described above, wherein in the first step, the first compound is represented by the following general formula (2):

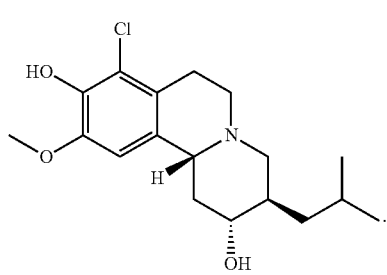

In an embodiment, the present invention provides the method described above, wherein in the second step, the second compound is represented by the following general formula (3):

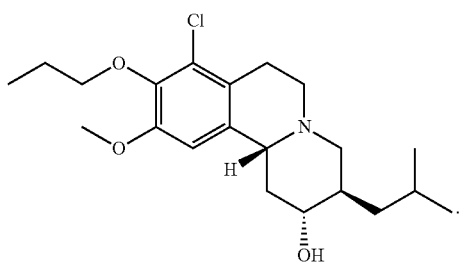

The F-18 positron diagnostic contrast agent according to the present invention can be used for positron emission tomography to detect type II vesicular monoamine transporter, produce no metabolites similar to F-18-propanol because the F-18 is marked on the aromatic ring, and can reduce the background value of normal organs while using.

BRIEF DESCRIPTION OF THE DRAWINGS

FIG. 2 is a flow chart illustrating the first step of a method of manufacturing the F-18 positron diagnostic contrast agent precursor according to a first embodiment of the present invention.

FIG. 3 is a flow chart illustrating the second step of a method of manufacturing the F-18 positron diagnostic contrast agent precursor according to a first embodiment of the present invention.

FIG. 4 is a flow chart illustrating the third step of a method of manufacturing the F-18 positron diagnostic contrast agent precursor according to a first embodiment of the present invention.

DETAILED DESCRIPTION OF THE PREFERRED EMBODIMENTS

Figure 1:
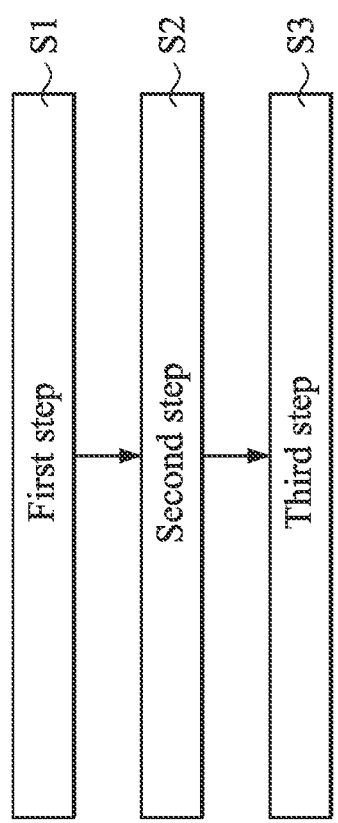
FIG. 1 is a flow chart illustrating a method of manufacturing the F-18 positron diagnostic contrast agent precursor according to a first embodiment of the present invention.

The preferred embodiments of the present invention are described in detail below with reference to FIGS. 1 to 4. The description is for explaining the embodiments of the present invention only, but not for limiting the scope of the claims.

An embodiment of the present invention provides an F-18 positron diagnostic contrast agent precursor represented by the following general formula (1):

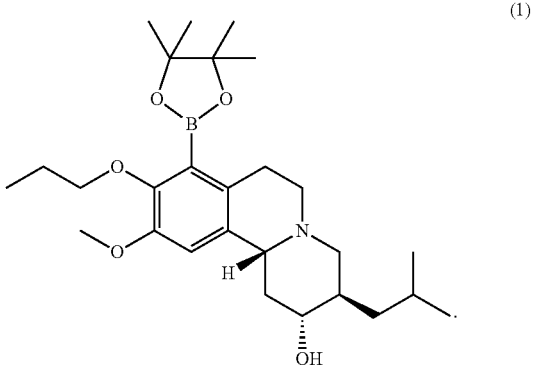

An embodiment of the present invention provides an F-18 positron diagnostic contrast agent formed by introducing a radioactive isotope fluorine-18 which replacing the pinacolborane group of the F-18 positron diagnostic contrast agent precursor described above.

An embodiment of the present invention provides the F-18 positron diagnostic contrast agent described above, wherein the F-18 positron diagnostic contrast agent is a contrast agent for detecting type II vesicular monoamine transporter.

An embodiment of the present invention provides the F-18 positron diagnostic contrast agent described above, wherein the F-18 positron diagnostic contrast agent is a contrast agent for positron emission tomography.

The F-18 positron diagnostic contrast agent precursor is an analog of dihydrotetrabenazine (DTBZ), which can specifically combine with type II vesicular monoamine transporter (VMAT2). It differs from DTBZ by a pinacolborane group introduced to the benzene ring.

The pinacolborane group can then be replaced by an F-18 radiolabel, to form the F-18 positron diagnostic contrast agent. Since the F-18 is marked on the aromatic ring and becomes an analog of F-18-AV-133, it is not expected to produce metabolites similar to F-18-propanol and can reduce the background value of normal organs.

As shown in FIG. 1 to 4, an embodiment of the present invention provides a method of manufacturing the F-18 positron diagnostic contrast agent precursor as described above, which comprising: a first step which dissolving 80 mg of (2R,3R,5R)-8-chloro-2,3,4,6,7,11-hexahydro-3-isobutyl-10-methoxy-1H-pyrido[2,1-a]isoquinoline-2,9-diol in 4.3 ml of anhydrous tetrahydrofuran, adding 20 mg of sodium hydride, stirring at room temperature for 5 minutes, adding 35 mg of N-chlorobutanediimide and refluxing at 66° C. for 4 hours, cooling down to room temperature to obtain a first reaction mixture, pouring the first reaction mixture into 20 ml of water, extracting 3 times with 20 ml of dichloromethane, removing water from the organic layer with anhydrous sodium sulfate, concentrating under reduced pressure, and performing liquid chromatography to obtain a first compound; a second step which dissolving 260 mg of the first compound in 21.7 ml of anhydrous acetone, adding 0.1 ml of 1-bromopropane and 1.08 g of cesium carbonate, refluxing at 60° C. for 2 hours, cooling down to room temperature, concentrating under reduced pressure to collect a second solid product, adding 21 ml of water to dissolve the second solid product, extracting 3 times with 21 ml of ethyl acetate to obtain a reaction product, collecting an organic layer of the reaction product, washing the organic layer with 12 ml of saturated brine, dehydrating the organic layer with anhydrous sodium sulfate, concentrating under reduced pressure, and performing liquid chromatography to obtain a second compound; and a third step which dissolving 90 mg of the second compound, 72 mg of B2Pin2, 4.3 mg of Pd2dba3, 4.5 mg of Xphos and 34.7 mg of KOAc in 1.2 ml of anhydrous 1,4-dioxane and refluxing at 110° C. for 3 hours to obtain a third reaction mixture, cooling down the third reaction mixture to room temperature, concentrating under reduced pressure at 55° C. to collect a third solid product, dissolving the third solid product in dichloromethane, filtering through celite to obtain a dissolved part, washing the dissolved part 3 times with water to obtain a third product, dehydrating a organic layer of the third product with anhydrous sodium sulfate, concentrating under reduced pressure, and performing liquid chromatography to obtain the F-18 positron diagnostic contrast agent precursor.

As shown in FIG. 2, an embodiment of the present invention provides the method described above, wherein in liquid chromatography of the first step, solid stationary phase is a $SiO_2$ column, liquid mobile phase is a 1:1 mixture of dichloromethane and ethyl acetate, and retention factor value is 0.37.

As shown in FIG. 3, an embodiment of the present invention provides the method described above, wherein in liquid chromatography of the second step, solid stationary phase is a $SiO_2$ column, liquid mobile phase is a 1:1 mixture of dichloromethane and ethyl acetate, and retention factor value is 0.625.

As shown in FIG. 4, an embodiment of the present invention provides the method described above, wherein in liquid chromatography of the third step, solid stationary phase is a $SiO_2$ column, liquid mobile phase is a 1:1 mixture of dichloromethane and ethyl acetate, and retention factor value is 0.65.

An embodiment of the present invention provides the method described above, wherein in the first step, the first compound is represented by the following general formula (2):

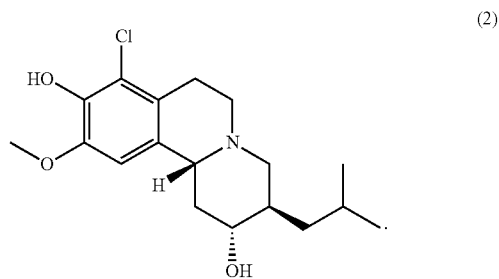

An embodiment of the present invention provides the method described above, wherein in the second step, the second compound is represented by the following general formula (3):

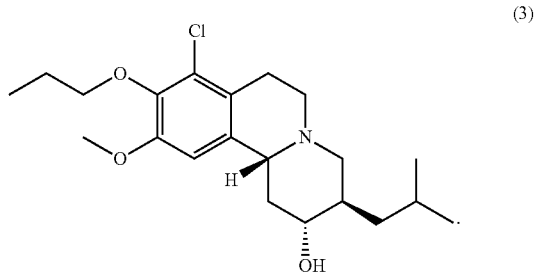

As described above, the F-18 positron diagnostic contrast agent precursor of the present invention can be used for manufacturing F-18 positron diagnostic contrast agent for positron emission tomography of type II vesicular monoamine transporter detection. The F-18 positron diagnostic contrast agent produces no metabolites such as F-18-propanol because the F-18 is marked on the aromatic ring, and can reduce the background value of normal organs while using.

The above description should be considered as only the discussion of the preferred embodiments of the present invention. However, a person having ordinary skill in the art may make various modifications without deviating from the present invention. Those modifications still fall within the scope of the present invention.

What is claimed is:

1. A method of manufacturing an F-18 positron diagnostic contrast agent precursor represented by the following general formula (1);

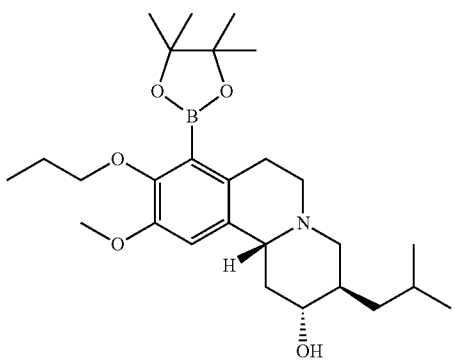

the method comprising:
a first step: dissolving 80 mg of (2R,3R,5R)-8-chloro-2,3,4,6,7,11-hexahydro-3-isobutyl-10-methoxy-1H-pyrido [2,1-a]isoquinoline-2,9-diol in 4.3 ml of anhydrous tetrahydrofuran, adding 20 mg of sodium hydride, stirring at room temperature for 5 minutes, adding 35 mg of N-chlorobutanediimine and refluxing at 66° C. for 4 hours, cooling down to room temperature to obtain a first reaction mixture, pouring the first reaction mixture into 20 ml of water, extracting 3 times with 20 ml of dichloromethane, removing water from the organic layer with anhydrous sodium sulfate, concentrating under reduced pressure, and performing liquid chromatography to obtain a first compound;
a second step: dissolving 260 mg of the first compound in 21.7 ml of anhydrous acetone, adding 0.1 ml of 1-bromopropane and 1.08 g of cesium carbonate, refluxing at 60° C. for 2 hours, cooling down to room temperature, concentrating under reduced pressure to collect a second solid product, adding 21 ml of water to dissolve the second solid product, extracting 3 times with 21 ml of ethyl acetate to obtain a reaction product, collecting an organic layer of the reaction product, washing the organic layer with 12 ml of saturated brine, dehydrating the organic layer with anhydrous sodium sulfate, concentrating under reduced pressure, and performing liquid chromatography to obtain a second compound; and
a third step: dissolving 90 mg of the second compound, 72 mg of B2Pin2, 4.3 mg of Pd2dba3, 4.5 mg of Xphos and 34.7 mg of KOAc in 1.2 ml of anhydrous 1,4-dioxane and refluxing at 110° C. for 3 hours to obtain a third reaction mixture, cooling down the third reaction mixture to room temperature, concentrating under reduced pressure at 55° C. to collect a third solid product, dissolving the third solid product in dichloromethane, filtering through celite to obtain a dissolved part, washing the dissolved part 3 times with water to obtain a third product, dehydrating a organic layer of the third product with anhydrous sodium sulfate, concentrating under reduced pressure, and performing liquid chromatography to obtain the F-18 positron diagnostic contrast agent precursor.

2. The method as claimed in claim 1, wherein in liquid chromatography of the first step, solid stationary phase is a SiO2 column, liquid mobile phase is a 1:1 mixture of dichloromethane and ethyl acetate, and retention factor value is 0.37.

3. The method as claimed in claim 1, wherein in liquid chromatography of the second step, solid stationary phase is a SiO2 column, liquid mobile phase is a 1:1 mixture of dichloromethane and ethyl acetate, and retention factor value is 0.625.

4. The method as claimed in claim 1, wherein in liquid chromatography of the third step, solid stationary phase is a SiO2 column, liquid mobile phase is a 1:1 mixture of dichloromethane and ethyl acetate, and retention factor value is 0.65.

5. The method as claimed in claim 1, wherein in the first step, the first compound is represented by the following general formula (2):

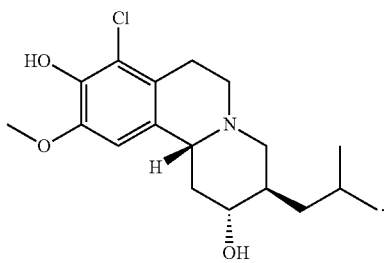

6. The method as claimed in claim 1, wherein in the second step, the second compound is represented by the following general formula (3):

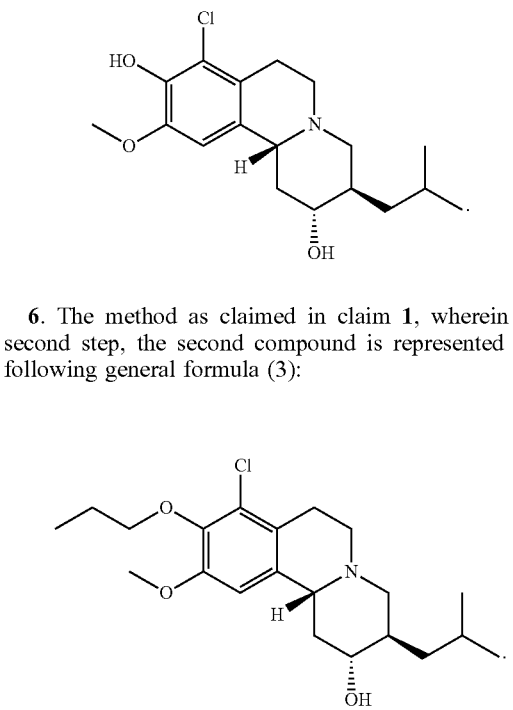

* * * * *